(12) United States Patent
Chapman et al.

(10) Patent No.: US 10,769,345 B1
(45) Date of Patent: Sep. 8, 2020

(54) CLOCK TREE OPTIMIZATION BY MOVING INSTANCES TOWARD CORE ROUTE

(71) Applicant: Cadence Design Systems, Inc., San Jose, CA (US)

(72) Inventors: Andrew Mark Chapman, Milton (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 29 days.

(21) Appl. No.: 16/228,451

(22) Filed: Dec. 20, 2018

(51) Int. Cl.
| | |
|---|---|
| G06F 17/50 | (2006.01) |
| G06F 30/396 | (2020.01) |
| G06F 30/392 | (2020.01) |
| G06F 30/398 | (2020.01) |
| G06F 30/3312 | (2020.01) |
| G06F 30/3953 | (2020.01) |
| G06F 30/394 | (2020.01) |
| G06F 111/04 | (2020.01) |
| G06F 119/12 | (2020.01) |
| G06F 30/337 | (2020.01) |
| G06F 30/3947 | (2020.01) |
| G06F 30/30 | (2020.01) |
| G06F 30/39 | (2020.01) |

(52) U.S. Cl.
CPC ........ G06F 30/396 (2020.01); G06F 30/3312 (2020.01); G06F 30/392 (2020.01); G06F 30/394 (2020.01); G06F 30/398 (2020.01); G06F 30/3953 (2020.01); G06F 30/30 (2020.01); G06F 30/337 (2020.01); G06F 30/39 (2020.01); G06F 30/3947 (2020.01); G06F 2111/04 (2020.01); G06F 2119/12 (2020.01)

(58) Field of Classification Search
None
See application file for complete search history.

(56) References Cited

U.S. PATENT DOCUMENTS

| | | | |
|---|---|---|---|
| 6,204,713 B1* | 3/2001 | Adams | G06F 30/394 |
| | | | 327/295 |
| 6,425,110 B1* | 7/2002 | Hathaway | G06F 30/327 |
| | | | 716/108 |
| 6,944,842 B1* | 9/2005 | Trimberger | G06F 30/39 |
| | | | 716/114 |
| 7,032,198 B2* | 4/2006 | Sano | G06F 30/327 |
| | | | 716/104 |
| 7,454,735 B2* | 11/2008 | Arthanari | G06F 1/10 |
| | | | 716/123 |

(Continued)

*Primary Examiner* — Leigh M Garbowski
(74) *Attorney, Agent, or Firm* — Schwegman Lundberg & Woessner, P.A.

(57) ABSTRACT

Aspects of the present disclosure address improved systems and methods for core-route-based clock tree wirelength reduction. A method may include accessing an integrated circuit design comprising a clock tree comprising routes that interconnect terminals of a plurality of clock tree instances. The method further includes identifying a core route in the clock tree. The method further includes determining a first offset based on a distance between the first terminal and the core route and determining a second offset based on a distance from the second terminal to the core route. The method further includes determining a target offset based on a combination of the first and second offsets and moving the clock tree instance toward the core route by the target offset.

20 Claims, 11 Drawing Sheets

(56) References Cited

U.S. PATENT DOCUMENTS

| | | | | |
|---|---|---|---|---|
| 7,865,861 | B2 * | 1/2011 | Habitz | G06F 30/394 |
| | | | | 716/130 |
| 8,572,418 | B2 * | 10/2013 | Singasani | G06F 1/10 |
| | | | | 713/322 |
| 8,751,991 | B2 * | 6/2014 | Irie | G06F 30/39 |
| | | | | 716/119 |
| 9,280,628 | B2 * | 3/2016 | Walker | G06F 30/327 |
| 9,443,053 | B2 * | 9/2016 | Jayakumar | G06F 30/394 |
| 9,792,396 | B2 * | 10/2017 | Arunachalam | G06F 30/392 |
| 9,922,157 | B1 * | 3/2018 | Ebeling | G06F 30/34 |
| 10,503,857 | B2 * | 12/2019 | Chou | G06F 30/39 |
| 2010/0083206 | A1 * | 4/2010 | Negishi | G06F 30/3312 |
| | | | | 716/113 |

* cited by examiner

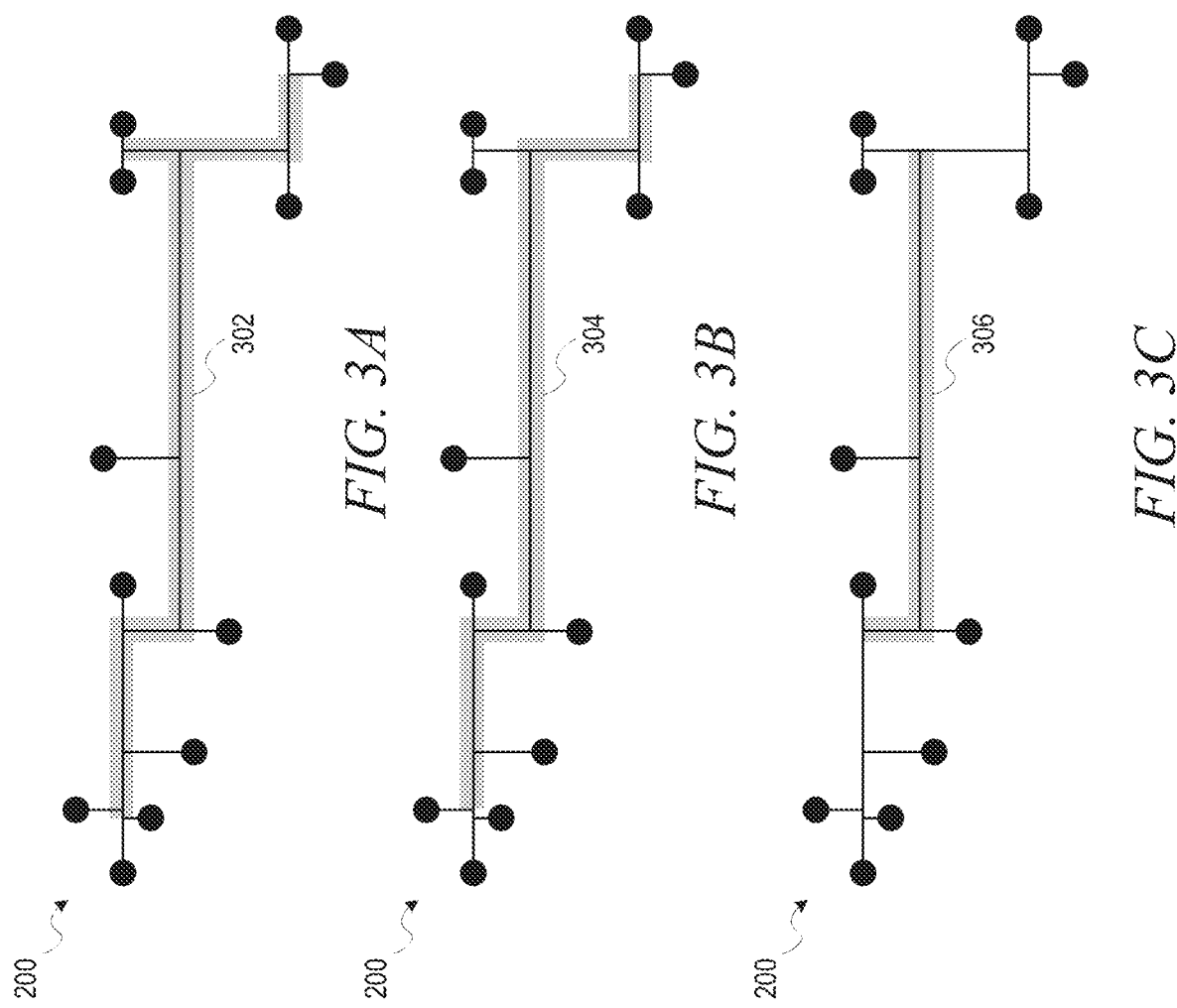

CLOCK TREE OPTIMIZATION BY MOVING INSTANCES TOWARD CORE ROUTE

TECHNICAL FIELD

The present disclosure generally relates to the technical field of integrated circuit design. In particular, the present disclosure addresses systems and methods for optimizing clock tree wirelength.

BACKGROUND

An integrated circuit (IC) layout specifies portions of various components of an IC. When the IC is to include a large number of registers, latches, flip-flops and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of drivers (e.g., buffers or inverters). A single driver distributes the clock signal to a grouping of other drivers and/or sinks. Connectivity between a driver and its fanout is represented by a "clock net" and will be physically implemented by routed wires.

Electronic design automation (EDA) software systems commonly perform clock-tree synthesis (CTS). Conventional approaches to CTS typically include a global wirelength reduction stage and a detailed wirelength reduction stage. During the global wirelength reduction stage, components of the clock tree (referred to hereinafter as "clock instances") are interconnected using a Steiner-tree approach in which the components are aligned to a Steiner route between their parents and children. During the detailed wirelength reduction stage, a compass-search algorithm is used to iteratively move clock instances to different locations, and a validation is performed at each move to verify the move results in a reduction in wirelength and conforms with design constraints (e.g., skew and slew). However, the compass-search, algorithm-based wirelength reduction is slow because it is a brute force approach that tests locations in an unguided way. While it does use the results it has found to guide future searches, storing and maintaining this information utilizes a large amount of computational resources. Additionally, to save runtime, the compass-search algorithm is "greedy," so the algorithm can easily get stuck in a local minimum, which means that despite the high runtime, the algorithm may not find an optimal location.

BRIEF DESCRIPTION OF THE DRAWINGS

Various ones of the appended drawings merely illustrate example embodiments of the present inventive subject matter and cannot be considered as limiting its scope.

FIGS. 3A-3C are conceptual diagrams that illustrate multiple core routes for a clock tree determined based on various transitive fanout thresholds, according to some embodiments.

DETAILED DESCRIPTION

Figure 1:
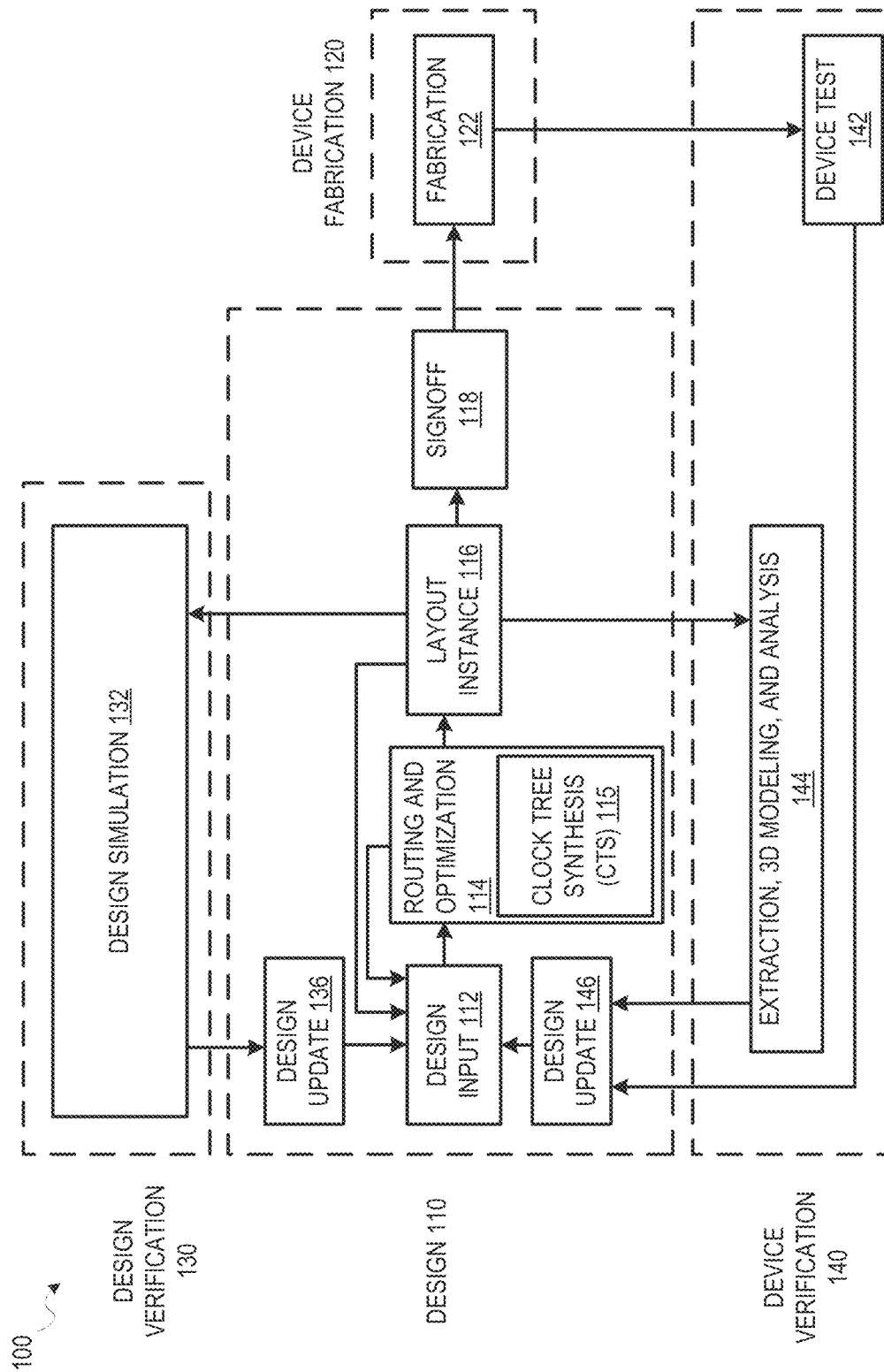
FIG. 1 is a diagram illustrating an example design process flow that includes core-route-based clock tree wirelength reduction process, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional techniques for clock tree wirelength reduction rely on brute force approaches that are computationally intensive and frequently fail to identify optimal solutions. Aspects of the present disclosure address this problem, among others, with systems and methods for clock tree wirelength reduction that include moving clock tree instances toward portions of the clock tree identified as "core" routes based on the transitive fanout of the clock tree. By moving clock tree instances toward the core route of the clock tree, a wirelength reduction can be achieved without significant changes to the topology. Further, moving clock tree instances in this manner achieves an improvement to runtime and a reduction in computational resource utilization when compared to traditional brute-force approaches by testing only a single location for each clock tree instance that, based on the manner in which it is identified, is highly likely to result in a reduction to wirelength.

Consistent with some embodiments, an initial clock tree that interconnects terminals of clock tree instances is iteratively refined as part of a clock tree wirelength reduction process. As part of this process, a new potential location for each clock instance is determined and validated to verify it results in a wirelength reduction and conforms to timing-based design constraints. At each iteration, terminals of a clock instance (e.g., routed pins) are identified and an offset for each terminal is determined based on a distance between the terminal and a core route in the clock tree. In some embodiments, the core route is determined by comparing a transitive fanout of branches of the clock tree to a transitive fanout threshold. In some embodiments, the core route is determined by comparing a wirelength of branches of the clock tree to a wirelength threshold.

A target offset for moving the clock tree instance is determined based on a combination of terminal offsets. The clock tree instance is moved toward the core route by the target offset to a new location. Assuming a successful validation of the new location of the clock tree instance, the clock tree wirelength reduction process moves to the next clock tree instance in the clock tree, and a new location for the next clock tree is determined and validated in the same manner as described above. The process may be repeated until a new location has been tested for every clock tree instance in the clock tree.

Consistent with some embodiments, the clock tree wirelength reduction process described above may be repeated in multiple passes such that the process is initially performed for each clock instance in a first pass, and the process is subsequently performed for each clock instance in a second pass. In the first pass, the target offset for each clock tree instance may be determined based on a first combination of the terminal offset such as by calculating a statistical mean. In the second pass, the target offset for each clock tree instance may be determined based on a second combination of the terminal offset such as by determining minimum of the terminal offsets. Within each pass, multiple iterations may be performed for each clock instance, and at each iteration a different threshold (e.g., transitive fanout or wirelength depending on the embodiment) may be used to determine the core route.

FIG. 1 is a diagram illustrating an example design process flow 100 that includes clock tree wirelength reduction based on common offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows optimization 114 occurring prior to a layout instance 116, routing, timing analysis, and optimization 114 may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 operation, which may be performed in accordance with various embodiments described herein. The CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes placing clock drivers at various regions of the IC design based on satisfaction of a set of clock tree design constraints, which can include slew, latency, and power consumption by the generated clock tree. Each clock tree driver delivers the clock signal to a set of clock sinks and/or a set of clock drivers. A clock net of the IC design describes interconnections between a clock driver and the clock sinks and drivers that are driven by the clock driver. Any one of the clock sources, sinks, and drivers may be referred to herein as a "clock instance."

As will be discussed in further detail below, an initial clock tree is constructed, for example, using the Steiner-tree approach. With the Steiner-tree approach, a minimum rectilinear Steiner tree (MRST) is used for routing a multi-pin clock net with minimum wire length. Given m points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, the computing device may utilize one of several known clock tree construction techniques to construct the initial clock tree.

As will be discussed further below, the initial clock tree may be iteratively refined as part of a clock tree wirelength reduction process. As part of this process, a new potential location for each clock instance is determined and validated to verify it results in a wirelength reduction and conforms to timing-based design constraints. At each iteration, terminals of a clock instance (e.g., routed pins) are identified and an offset for each terminal is determined based on a distance between the terminal and a core route in the clock tree. In some embodiments, the core route is determined based on a transitive fanout threshold. The transitive fanout threshold is determined based on a total number of pins in the clock tree and a predetermined transitive fanout percentage. In some embodiments, the core route is determined based on a wirelength threshold.

A target offset for moving the clock tree instance is determined based on a combination of terminal offsets, and the clock tree instance is moved toward the core route by the target offset. In this manner, the clock tree instance is moved from an initial location to a target location based on the target offset. The clock tree is updated based on the new location of the clock instance by modifying the connected routes based on the new location (e.g., by shortening one or more routes).

Assuming a successful validation of the updated clock tree, the clock tree wirelength reduction process moves to the next clock tree instance in the clock tree, and a new location for the next clock tree is determined and validated in the same manner as described above. The process may be repeated until a new location has been tested for every clock tree instance in the clock tree.

Consistent with some embodiments, the clock tree wirelength reduction process described above may be repeated in multiple passes such that the process is initially performed for each clock instance in a first pass, and the processes is subsequently performed for each clock instance in a second pass. In the first pass, the target offset for each clock tree instance may be determined based on a first combination of the terminal offset such as by calculating a statistical mean. In the second pass, the target offset for each clock tree instance may be determined based on a second combination of the terminal offset such as by determining the minimum of the terminal offsets. Within each pass, multiple iterations may be performed for each clock instance, and at each iteration a different threshold (e.g., a transitive fanout or wirelength threshold) may be used to determine the core route.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2A:
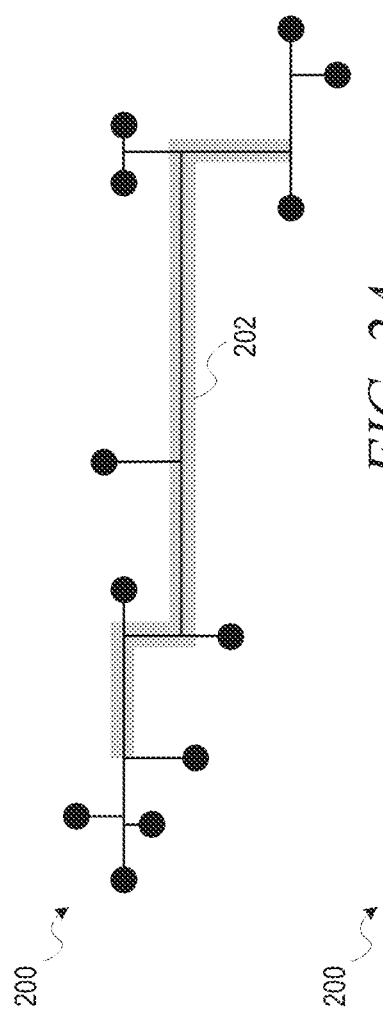
FIGS. 2A-2C are conceptual diagrams that illustrate a core-route-based clock tree wirelength reduction process, according to some embodiments.
Figure 2B:
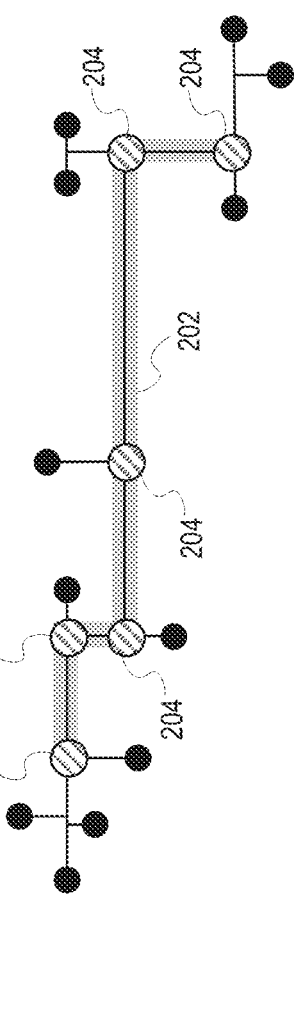
Figure 2C:
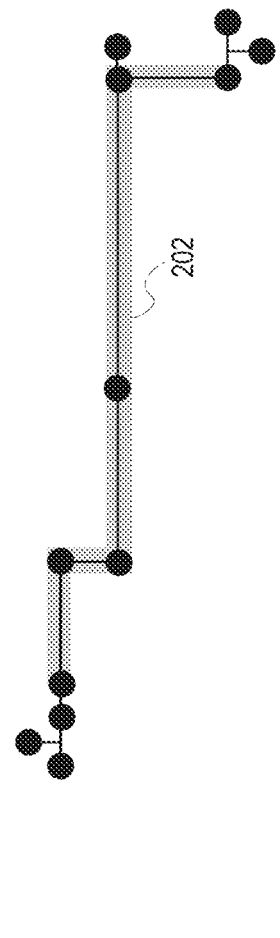
Figure 4:
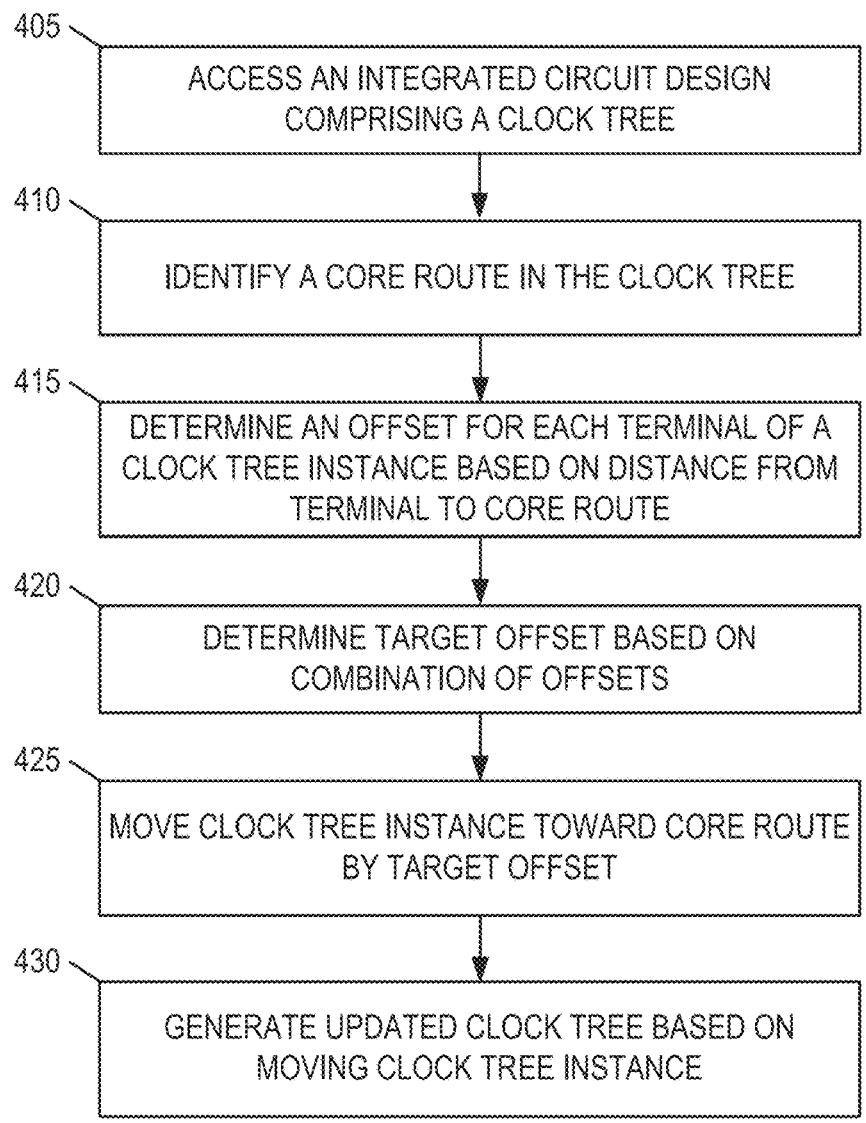
FIGS. 4-8 are flowcharts illustrating operations of a method for core-route-based clock tree wirelength reduction, according to some example embodiments.

FIGS. 2A-2C are conceptual diagrams that illustrate a core-route-based clock tree wirelength reduction process, according to some embodiments. With reference to FIG. 2A, a portion of a clock tree 200 is illustrated. The portion of clock tree 200 comprises routes that connect pins of a clock net. In the context of FIGS. 2A-2C, solid circles are used to represent pins and lines are used to represent routes for wires that interconnect the pins. Each pin in the multi-pin clock net corresponds to a terminal of a clock instance (e.g., a clock driver or a clock sink). As will be discussed in further detail below, in the example illustrated in FIGS. 2A-2C, a core route 202 is identified based on a transitive fanout threshold that is determined based on a total number of terminals in the clock net and a predetermined transitive fanout percentage (e.g., 40%, 30%, 25%, 15%, etc.). The core route 202 is identified such that the transitive fanout (e.g., a number of connected terminals) of any given branch (i.e., a node with two or more connected edges) outside the core route 202 does not exceed the transitive fanout threshold.

As part of the core-route-based clock tree wirelength reduction process, clock tree instances are iteratively moved toward the core route 202. In particular, as shown in FIG. 2B, target locations 204 for moving clock tree instances toward the core route 202 are determined, and as shown in FIG. 2C, the clock tree 200 is updated by moving clock tree instance terminals toward the target locations 204, thereby resulting in an updated clock tree 210 in which clock tree instances are placed closer to the core route 202.

As noted above, the core route 202 is determined based on a transitive fanout threshold that is determined based on a total number of terminals in the clock tree 200 and a predetermined transitive fanout percentage. In the example illustrated in FIGS. 2A-2C, the portion of the clock tree 200 comprises 12 terminals and the predetermined transitive fanout percentage is 25%. Hence, the transitive fanout threshold used to determine the core route 202 is 3 terminals. That is, the transitive fanout of any given branch outside the core route 202 does not exceed 3 terminals. As will be discussed further below, the core-route-based wirelength reduction process may be performed in multiple iterations, and at each iteration a different transitive fanout percentage may be used to determine the transitive fanout threshold for identifying the core route.

As an example of the foregoing, FIGS. 3A-3C illustrate additional core routes for the clock tree 200 based on various transitive fanout percentages. In FIG. 3A, core route 302 is determined based on a transitive fanout percentage of 8%, which leads to a transitive fanout threshold of 1 terminal (8% of 12 is 1). Thus, the transitive fanout of any given branch in the core route 302 exceeds 1 terminal.

In FIG. 3B, core route 304 is determined based on a transitive fanout percentage of 17%, which leads to a transitive fanout of 2 terminals (17% of 12 is 2). Thus, the transitive fanout of any given branch in the core route 302 exceeds 2 terminals.

In FIG. 3C, core route 306 is determined based on a transitive fanout percentage of 33%, which leads to a transitive fanout of 4 terminals (33% of 12 is 4). Thus, the transitive fanout of any given branch in the core route 302 exceeds 4 terminals.

FIGS. 4-9 are flowcharts illustrating operations of a method 400 for clock tree wirelength reduction based on common offsets in connected routes, according to some example embodiments. For some embodiments, the method 300 is performed as part of a CTS process applied to a circuit design (e.g, by an EDA software system).

It will be understood that the method 400 may be performed by a device, such as a computing device executing instructions of an EDA software system. For instance, the operations of a method 400 may be represented by executable instructions (e.g., EDA software) that, when executed by a processor of a computing device, cause the computing device to perform the method 400. Thus, an operation of the method 400 may be performed by a hardware processor (e.g., central processing unit or graphics processing unit) of a computing device (e.g., desktop, server, etc.). Accordingly, the method 400 is described below in reference to such a computing device.

Depending on the embodiment, an operation of the method 400 may be repeated in different ways or involve intervening operations not shown. Though the operations of the method 400 may be depicted and described in a certain order, the order in which the operations are performed may vary among embodiments, including performing certain operations in parallel.

The method 400 as illustrated begins at operation 405 where the computing device accesses integrated circuit design stored in a memory of the computing device. The integrated circuit design comprises a clock tree comprising one or more routes that connect terminals of clock tree instances. As will be discussed below, the method 400 may be iteratively repeated for each clock instance in the clock tree, in which case, the clock tree accessed at operation 405 may, in some instances, be a clock tree that is a modified version of a clock tree previously accessed at operation 405.

At operation 410, the computing device determines a core route in the clock tree (e.g., core route 202). As will be discussed below, in some embodiments, the computing device determine the core route in the clock tree based on a transitive fanout threshold. The transitive fanout threshold is determined based on a total number of terminals in the clock tree and a predetermined transitive fanout percentage. For example, given a clock tree with 12 terminals and a transitive fanout percentage of 33%, the transitive fanout threshold is 4 (33% of 12). Consistent with these embodiments, the determining of the core route includes identifying a portion of a route in the clock tree having a maximum transitive fanout that exceeds the transitive fanout threshold. The identified route comprises edges of the clock tree with the greatest fanout that exceed the transitive fanout threshold.

In some embodiments, the computing device determines the core route in the clock tree based on a wirelength threshold. The wirelength threshold is determined based on a total wirelength of the clock tree and a predetermined wirelength percentage. Consistent with these embodiments, the determining of the core route includes identifying a portion of a route in the clock tree comprising one or more nodes that drive a wirelength that exceeds the wirelength threshold.

At operation 415, the computing device determines offsets for each terminal of the clock tree instance. The computing device may determine an offset for a terminal of the clock tree instance based on a distance between the terminal and the core route. Each terminal of the clock tree instance corresponds to a pin of the clock tree instance. In the clock tree, each terminal is connected to a route that connects the clock tree instance to a terminal of another clock instance (e.g., a parent or child of the clock instance). Some clock instances such as buffers and inverters may include two terminals (e.g., an input terminal and an output terminal) while other clock tree instances such as logic gates may include three or more terminals. In determining a distance between a terminal and the core route, the computing device may determine a Manhattan distance between the terminal and the core route. Hence, an offset may comprise a Manhattan distance between a terminal and the core route.

As an example of operation 415, the computing device may determine a first offset based on a distance (e.g., a Manhattan distance) between a first terminal (e.g., an input terminal of a buffer or inverter) of the clock tree instance and the core route in the clock tree. Following this example, the computing device may determine a second offset based on a distance (e.g., a Manhattan distance) between a second terminal (e.g., an output terminal of a buffer or inverter) and the core route in the clock tree.

Consistent with some embodiments, the computing device may determine the offsets without first identifying the core route. That is, the computing device may employ techniques to determine a distance between a terminal and a core route without identifying the actual core route. In these embodiments, the computing device may simply determine a distance between the terminal and a target node identified as being located on the core route. Further details regarding determining offsets for each terminal of the clock tree instance are discussed below in reference to FIG. 7.

At operation 420, the computing device determines a target offset based on a combination of the offsets for the terminals of the clock tree instance. As an example, determining the target offset may include calculating a statistical mean of the offsets. In another example, the determining of the target offset may include determining a minimum common component of the offsets. As noted above, the wirelength reduction process may be performed in multiple passes, and the way the computing device determines the target offset may depend on which pass the determination is being made in. For example, in a first pass, the computing device may determine the target offset based on the statistical mean of the offsets, and in a second pass, the computing device may determine the target offset based a minimum common component of the offsets. Further details regarding the determining of the target offset are discussed below in reference to FIGS. 7 and 8.

At operation 425, the computing device moves the clock tree instance toward the core route by the target offset. In doing so, the computing device moves the clock tree instance from an initial location to a new location based on the target offset. The new location may also be referred to as a "target location."

At operation 430, the computing device generates an updated clock tree for the integrated circuit design based on moving the clock tree instance to the target location of the clock instance. In generating the updated clock tree, the computing device updates one or more connected routes of the clock tree instance to align with the new location of the clock instance. The computing device may shorten a length of one or more connected routes of the clock instance, thereby achieving a wirelength reduction in the updated clock tree when compared to the initial clock tree. Because of design constraints, cells of the IC design are to be aligned into rows, and as a result, in some instances, in updating the clock tree, the computing device may snap the clock tree instance to a nearby location that may not be perfectly aligned with the target location.

Figure 5:
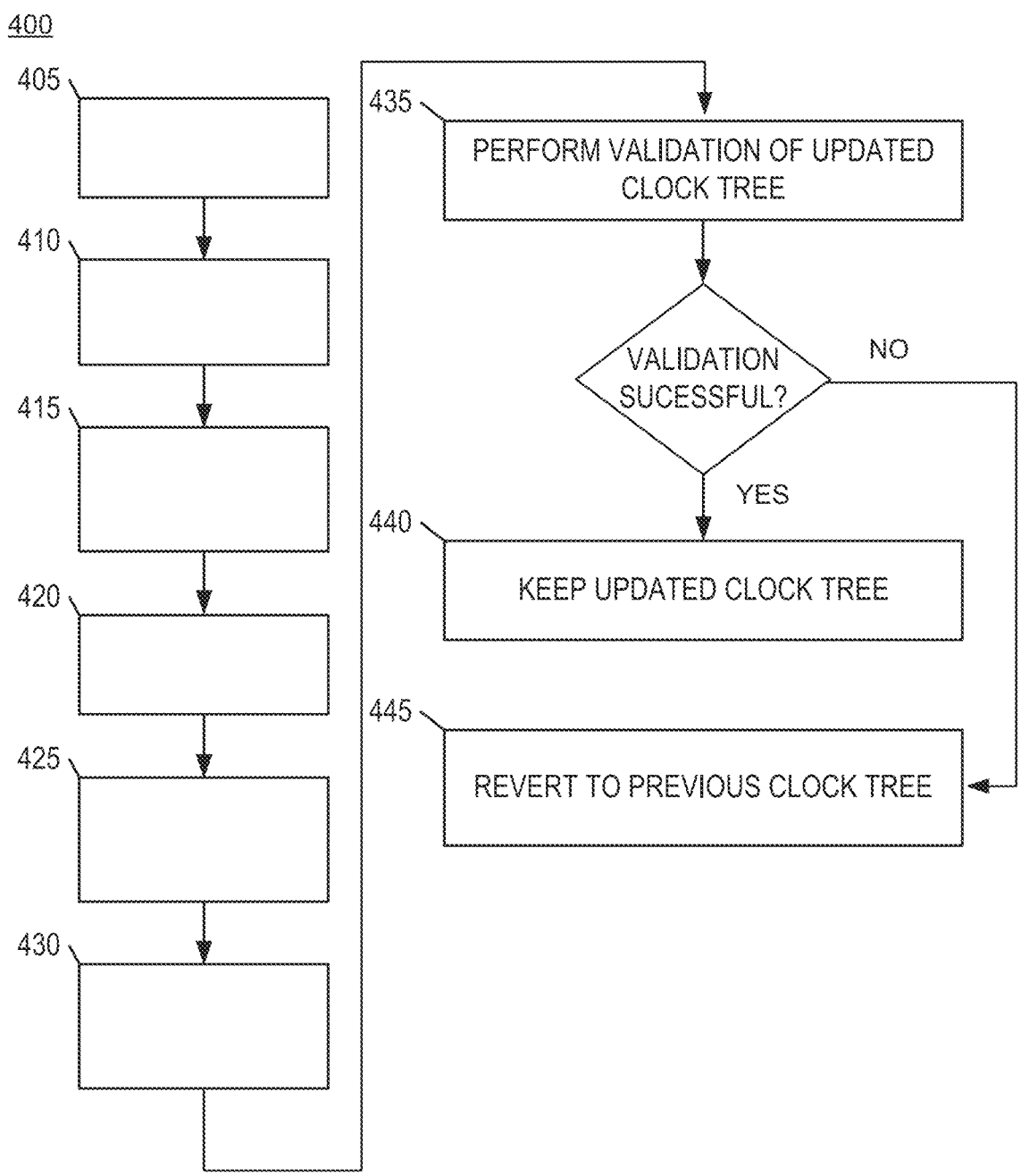

As shown in FIG. 5, the method 400 may, in some embodiments, include operations 435, 440, and 445. Consistent with these embodiments, the operations 435, 440, and 445 may be performed subsequent to operation 435 where the computing device updates the clock tree.

At operation 435, the computing device performs a validation of the updated clock tree. In performing the validation, the computing device validates that moving the clock tree instance by the target offset results in a wirelength reduction when compared to the initial location of the clock tree instance in the clock tree. The computing device also validates that the updated clock tree does not violate any timing constraints (e.g., skew and slew).

If the validation is successful, the computing device keeps the updated clock tree (operation 440). If the validation is not successful, the computing device discards the updated clock tree and reverts to the previous clock tree (operation 445). In reverting to the previous clock tree, the computing device may move the clock instance back to the initial location.

The method 400 may be iteratively repeated such that the operations of the method 400 are performed with respect to each clock tree instance in the clock tree. On subsequent iterations of the method 400, the clock tree accessed by the computing device at operation 405 may be updated the clock tree produced as a result of performing the previous iteration of the method 400 if the updated clock was successfully validated. Otherwise, the clock tree accessed at a subsequent iteration of the method 400 is the clock tree accessed at the previous iteration of the method 400.

As noted above, in some embodiments, multiple passes of clock tree wirelength reduction may be performed. In a first pass, the method 400 is performed with respect to each clock tree instance using a statistical mean of terminal offsets to determine the target offset for each clock instance. In a second pass, the method 400 is performed with respect to each clock tree instance using a common minimum component of terminal offsets to determine the target offset for each clock instance. As an example, in a first pass, the computing device may determine a first target offset for a clock tree instance based on a statistical mean of a first and second offset and move the clock instance toward the core route by the first target offset. In a second pass, the computing device may determine a second target offset for the clock tree instance based on a common minimum component of the first and second offset and move the clock instance toward the core route by the second target offset. Prior to determining the second target offset, the computing device may recalculate the first and second target offsets during the second pass based on a new location of the clock instance resulting from moving the clock instance toward the core route in the first pass. Further, in some instances, the core route may be modified as a result of moving other clock tree instances during the first pass. In these instances, the second target offset determined during the second pass may be based on a modified core route (specifically distances of the terminals of the clock instance to the modified core route).

Additionally, within each pass of the clock tree wirelength reduction process, multiple iterations of the method 400 may be performed for each clock instance, and at each iteration a different threshold (e.g., transitive fanout or wirelength threshold) may be used in determining the core route. For example, at each subsequent iteration, a smaller threshold may be used to aide in convergence of an overall clock tree wirelength reduction solution.

As an example, in a first iteration, the computing device tests moving each clock tree instance towards a first core route determined from a first transitive fanout percentage (e.g., 40%); in a second iteration, the computing device tests moving each clock tree instance toward a second core route determined from a second transitive fanout percentage (e.g., 32%); in a third iteration, the computing device tests moving each clock tree instance toward a third core route determined from a third transitive fanout (e.g., 24%); in a fourth iteration, the computing device tests moving each clock tree instance toward a fourth core route determined from a fourth transitive fanout percentage (e.g., 16%); and in a fifth iteration, the computing device tests moving each clock tree instance toward a fifth core route determined from a transitive fanout percentage (e.g., 8%).

Following this example from the perspective of a single clock instance, in the first iteration, the computing device determines a first and second offset based on respective distances of terminals of the clock instance to the first core route and moves the clock instance toward the first core route by a first target offset determined from a combination of the first and second offsets. In the second iteration, the computing device determines a third and fourth offset based on respective distances of the terminals of the clock instance to the second core route and moves the clock instance toward the second core route by a second target offset determined from a combination of the first and second offsets. A similar process follows from the third, fourth, and fifth iterations.

Figure 6:
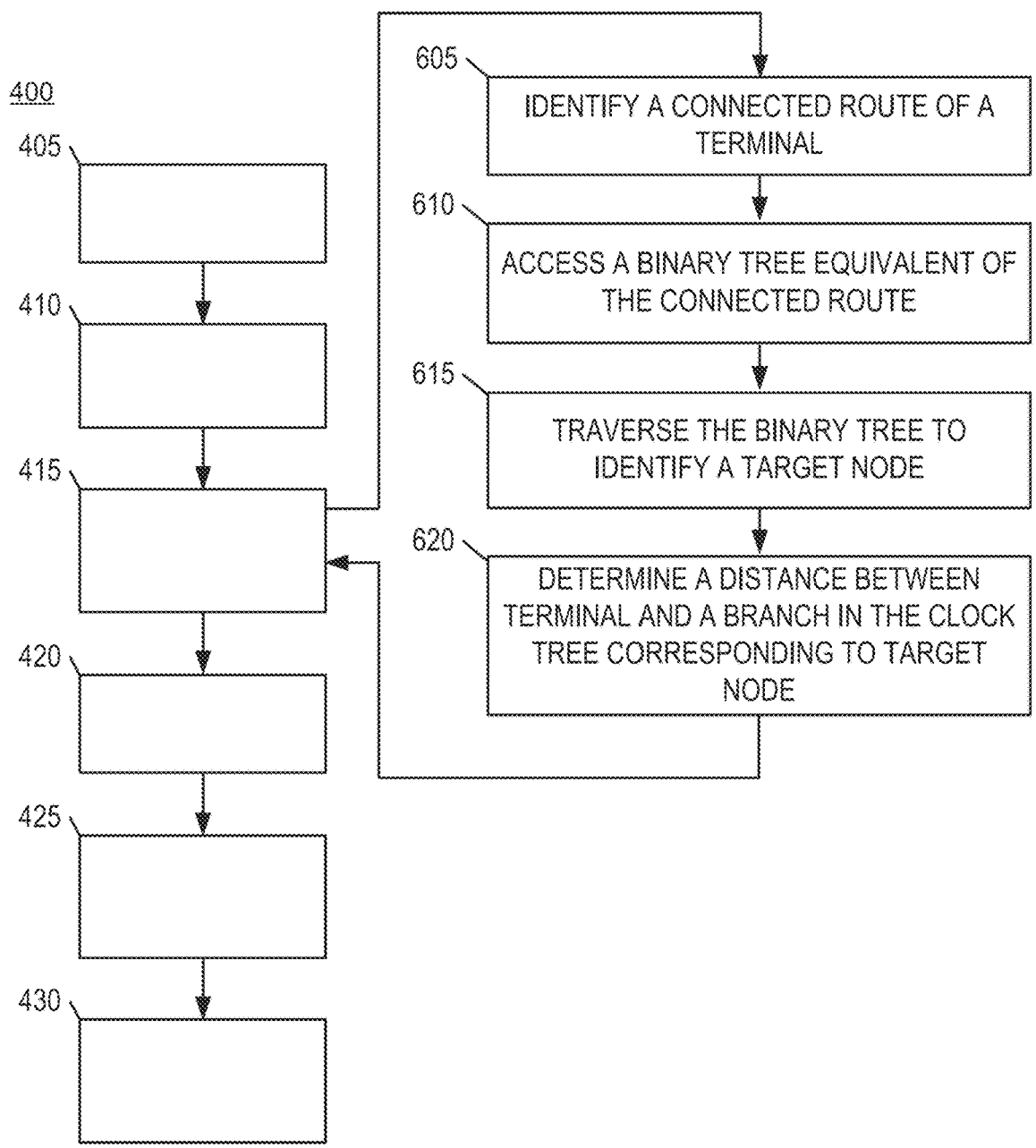

As shown in FIG. 6, the method 400 may, in some embodiments, include operations 605, 610, 615, and 620. Consistent with some embodiments, operations 605, 610, 615, and 620 may be performed as part of operation 415 (e.g., sub-operations or a sub-routine) where the computing device determines an offset for each terminal of a clock tree instance. Though operations 605, 610, 615, and 620 are described below in reference to a single terminal of the clock tree instance, the operations 605, 610, 615, and 620 may be performed for each terminal of the clock tree instance.

At operation 605, the computing device identifies a connected route of a terminal of the clock tree instance. The connected route connects the terminal of the clock tree instance to at least a terminal of another clock tree instance. At operation 610, the computing device accesses a binary tree equivalent of the connected route. The binary tree comprises a plurality of nodes and edges connecting the nodes. Each node corresponds to a pin (e.g., a clock tree instance terminal) in the clock tree.

At operation 615, the computing device traverses the binary tree to identify a target node. In some embodiments, the computing device identifies a target node that has a transitive fanout that is less than a transitive fanout threshold. In some embodiments, the computing devices identifies a target node that drives a wirelength that is less than a wirelength threshold.

The manner in which the computing device traverses the binary tree depends on whether the terminal of the clock tree instance drives a connected clock net or is driven by a connected clock net. If the terminal of the clock tree instance drives a clock net, the traversing of the binary tree comprises performing a top-down search of the binary tree starting from a root node corresponding to the terminal. For example, the computing device may initially determine a transitive fanout for each of the two child nodes connected to the root node (e.g., a left and a right node) based on a number of pins connected to each. The computing device may then traverse to the child node with the highest transitive fanout and determine a transitive fanout for each of the two child nodes connected to that node. The computing device may continue to perform such a top-down search by selecting, at each node, the child node with the highest transitive fanout until the computing device reaches a node where the transitive fanout of the next such node is less than the transitive fanout threshold, at which point the search of the binary tree ends. The node at which the search of the binary tree ends is the target node. In some other embodiments, the above referenced process may be performed with respect to wirelength rather than transitive fanout.

If the terminal of the clock tree instance is driven by a driver in the clock net, the traversing of the binary tree comprises performing a bottom-up search of the binary tree starting from a leaf node corresponding to the terminal. For example, the computing device may determine the transitive fanout of the parent node of the leaf node corresponding to the terminal. If the transitive fanout of the parent node is greater than the transitive fanout threshold, the computing device identifies the parent node as the target node. Otherwise, the computing device continues to search upward through the binary tree to identify a node with a transitive fanout that is greater than the transitive fanout threshold. Accordingly, the target node may be a parent node, grandparent node, a great grandparent node, and so forth of the leaf node corresponding to the terminal. In some other embodiments, the above referenced process may be performed with respect to wirelength rather than transitive fanout At operation 620, the computing device determines a distance between the terminal and a branch in the clock tree corresponding to the target node in the binary tree equivalent of the connect route of the terminal. For example, the computing device may determine a rectilinear Manhattan distance between the terminal and the branch in the clock tree.

Figure 7:
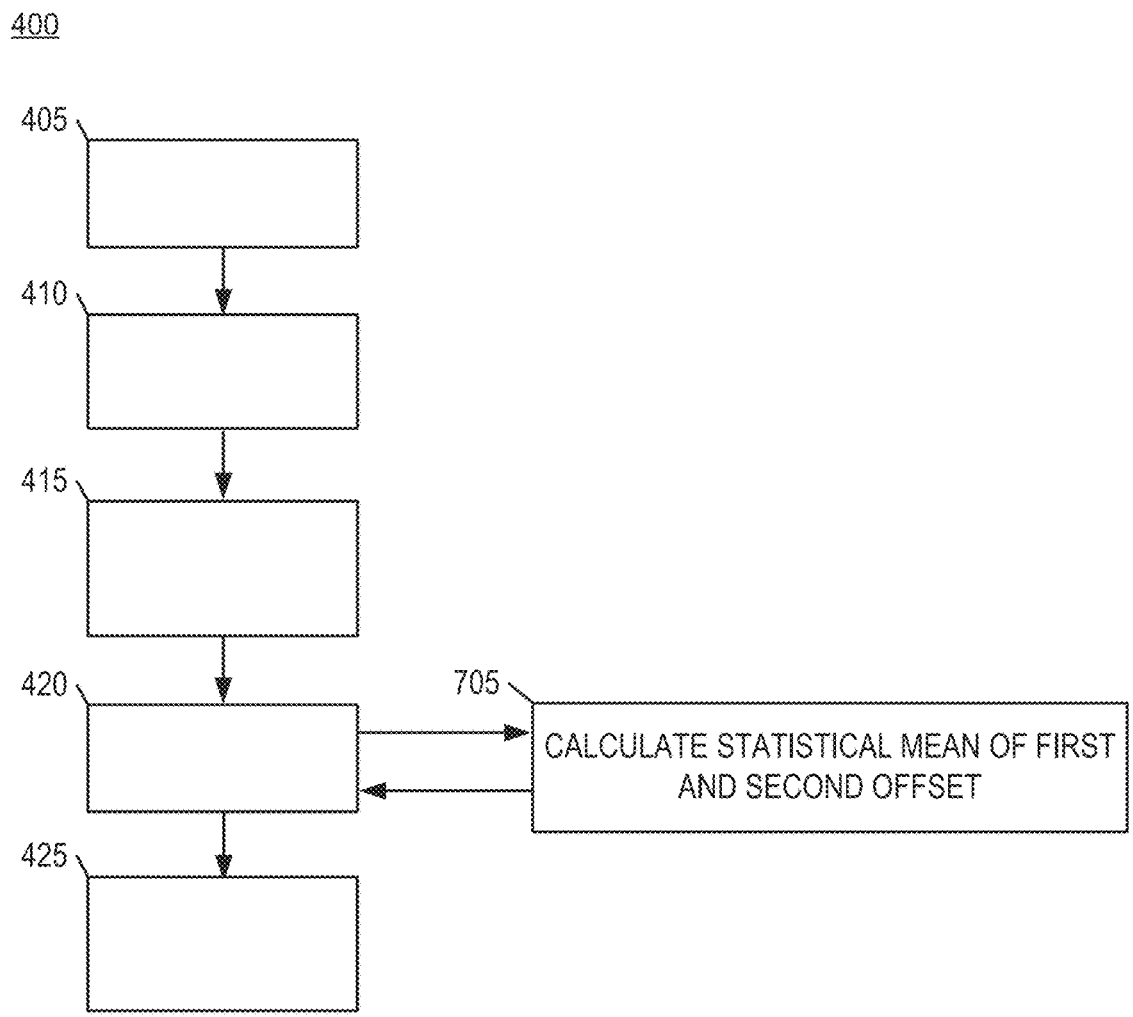

As shown in FIG. 7, the method 400 may, in some embodiments, include operation 705. Consistent with these embodiments, the operation 705 may be performed as part of (e.g., a sub-operation or a sub-routine) of operation 420 where the computing device determines a target offset. Consistent with some embodiments, the operation 705 may be performed as part of operation 420 during a first pass of a wirelength reduction process. At operation 705, the computing device calculates a statistical mean of a first and second offset. The first offset corresponds to a distance between a first terminal of the clock instance and the core route and the second offset corresponds to a distance between the second terminal of the clock instance and the core route.

Figure 8:
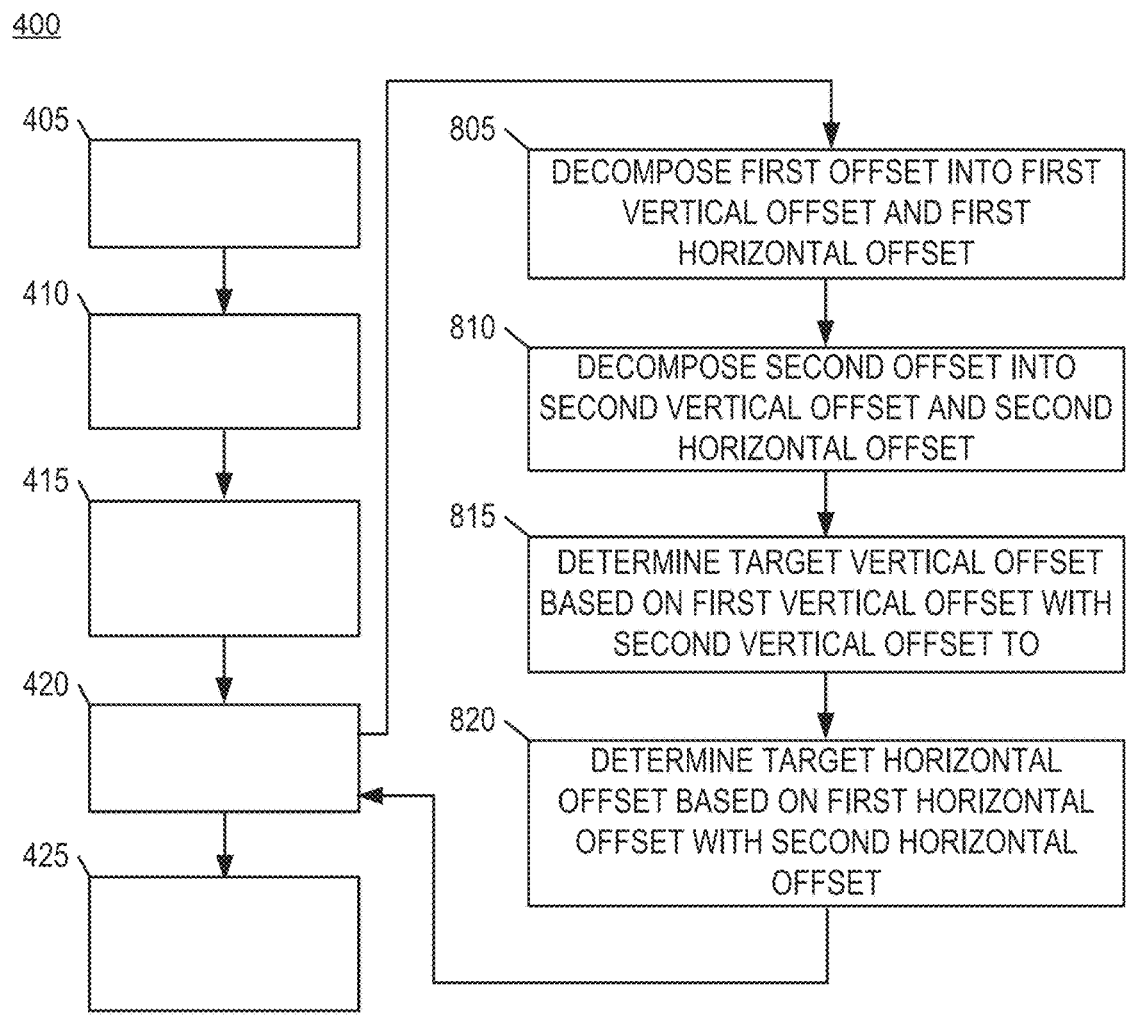

As shown in FIG. 8, the method 400 may, in some embodiments, include operations 805, 810, 815, and 820. Consistent with some embodiments, operations 805, 810, 815, and 820 may be performed as part (e.g., sub-operations or a sub-routine) of operation 420 where the computing device determines the target offset for moving the clock tree instance. At operation 805, the computing device decomposes a first offset into a first vertical offset and a first horizontal offset. The first offset corresponds to a distance between a first terminal of the clock tree instance and the core route. The first vertical offset is the vertical component of the first offset, and the first horizontal offset is the horizontal component of the first offset.

In decomposing the first offset, the computing device may compare the vertical or horizontal component of the first offset with a threshold distance. If the vertical and horizontal components are less than the threshold distance, the computing device sets the first vertical and horizontal offsets in accordance with the vertical and horizontal components of the first offset. However, if the vertical component of the first offset exceeds the threshold distance, the computing device sets the first vertical offset as the threshold distance. Similarly, if the horizontal component of the first offset exceeds the threshold distance, the computing device sets the first horizontal offset as the threshold distance.

At operation 810, the computing device decomposes a second offset into a second vertical offset and a second horizontal offset. The second offset corresponds to a distance between a second terminal of the clock tree instance and the core route. The second vertical offset is the vertical component of the second offset, and the second horizontal offset is the horizontal component of the second offset. In decomposing the second offset, the computing device may also compare the vertical or horizontal component of the second offset with the threshold distance. If the vertical and horizontal components are less than the threshold distance, the computing device sets the second vertical and horizontal offsets in accordance with the vertical and horizontal components of the second offset. However, if the vertical component of the second offset exceeds the threshold distance, the computing device sets the second vertical offset as the threshold distance. Similarly, if the horizontal component of the second offset exceeds the threshold distance, the computing device sets the second horizontal offset as the threshold distance.

The computing device, at operation 815, compares the first vertical offset with the second vertical offset to determine a target vertical offset. In comparing the first vertical offset with the second vertical offset, the computing device determines whether the first and second vertical offsets are in the same direction (e.g., upward or downward). If the first and second vertical offsets are in the same direction, the computing device selects the minimum vertical offset (e.g., the vertical offset corresponding to the shortest distance) as the target vertical offset. Hence, the target vertical offset comprises a vertical distance corresponding to the minimum vertical offset. If the first and second vertical offsets are not in the same direction (e.g., the first vertical offset is upward and the second vertical offset is downward), the computing device determines the target vertical offset is zero.

The computing device, at operation 820, compares the first horizontal offset with the second horizontal offset to determine a target horizontal offset. In comparing the first horizontal offset with the second horizontal offset, the computing device determines whether the first and second horizontal offsets are in the same direction (e.g., rightward or leftward). If the first and second horizontal offsets are in the same direction, the computing device selects the minimum horizontal offset (e.g., the horizontal offset corresponding to the shortest distance) as the target horizontal offset. Hence, the target horizontal offset may comprise a horizontal distance corresponding to the minimum horizontal offset. If the first and second horizontal offsets are not in the same direction (e.g., the first horizontal offset is rightward and the second horizontal offset is leftward), the computing device determines the target horizontal offset is zero.

Although certain examples presented above address an in which a clock tree instance has two terminals, as noted above, a clock tree instance may have two or more clock tree instances. Thus, it shall be appreciated that the methodology described herein is not intended to be limited in application to clock tree instances with only two terminals and this methodology may also be applicable to clock tree instances with more than two terminals.

Figure 9A:
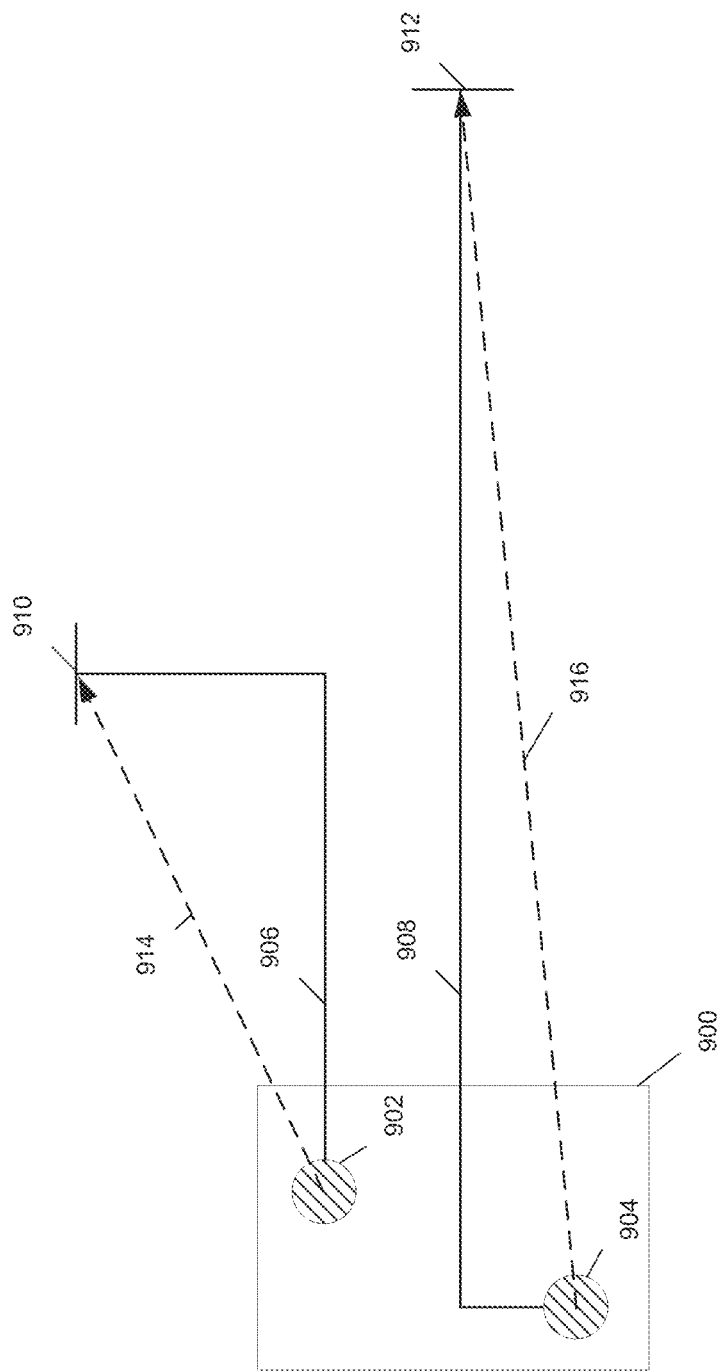
FIGS. 9A and 9B are conceptual diagrams that graphically illustrate an operation of determining a target offset in connected routes of a clock tree instance, which is performed as part of a method for clock tree wirelength reduction, according to some example embodiments.
Figure 9B:
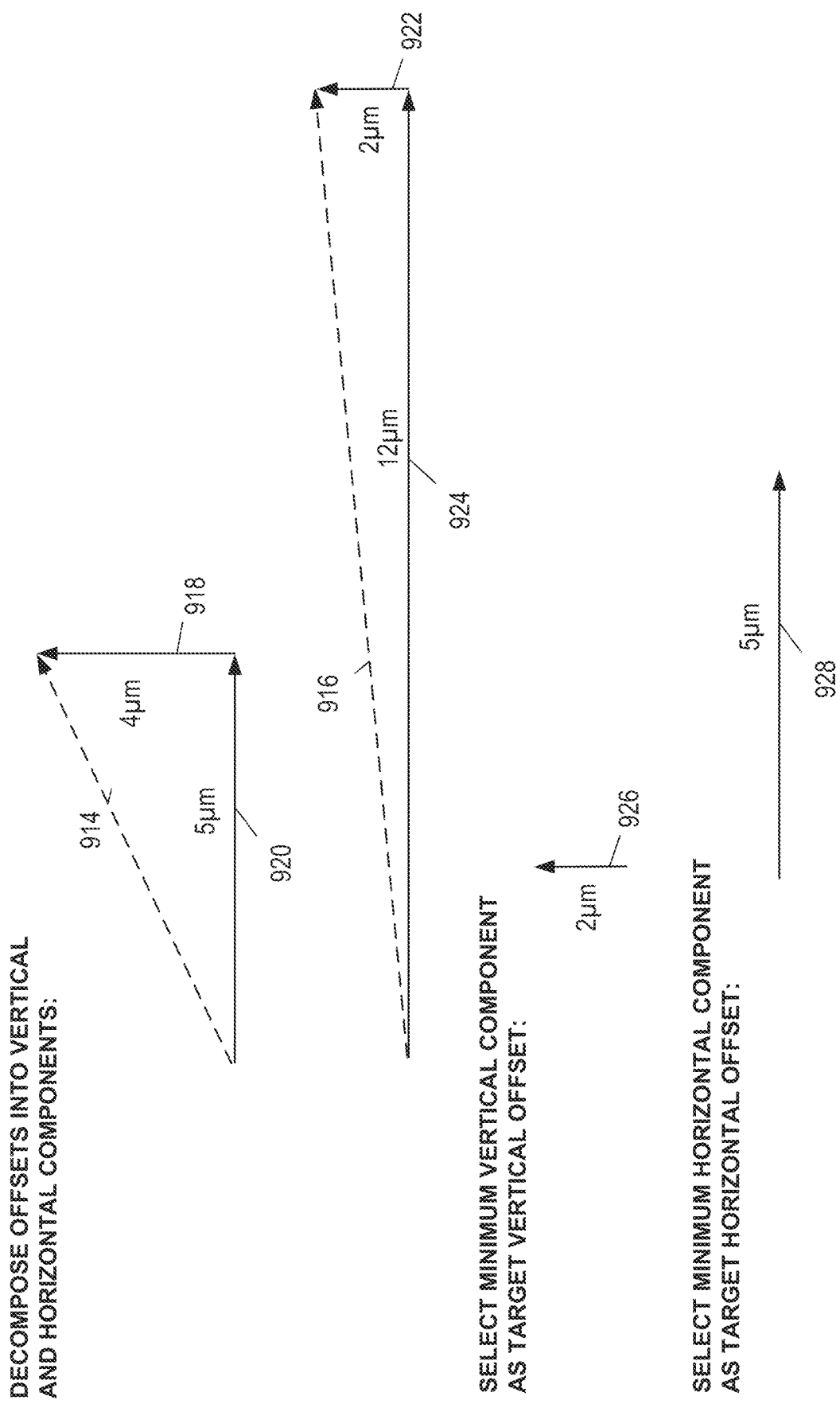

FIGS. 9A and 9B are conceptual diagrams that graphically illustrate an operation of determining a target offset for a clock tree instance 900 (e.g., performed by a computing device executing instructions of an EDA software system), according to some example embodiments. Consistent with some embodiments, the operation of determining the target offset for the clock tree instance 900 corresponds to the operations 805, 810, 815, and 820, which may be performed as part of the operation 420 of the method 400. It will be understood that the operations illustrated in FIGS. 9A and 9B are performed by a device, such as a computing device executing instructions of an EDA software system, and accordingly FIGS. 9A and 9B may be described below with reference to such a computing device.

As shown in FIG. 9A, the clock tree instance 900 includes terminals 902 and 904. A route 906 is connected to the terminal 902, and a route 908 is connected to the terminal 904. The route 906 includes a branch 910 (e.g., a node with two or more connected edges), and the route 908 includes a branch 912. Both the branches 910 and 912 correspond to a core route of a clock tree in which the clock tree instance 900 is included. For example, consistent with some embodiments, the branch 910 may be identified as a target node in search of a binary tree equivalent of the connected route 906, and the branch 912 may be identified as a target node in a search of a binary tree equivalent of the connected route 908. As shown, an offset 914 corresponds to a distance between the terminal 902 and the branch 910, and an offset 916 corresponds to a distance between the terminal 904 and the branch 912.

FIG. 9B illustrates a comparison of the offsets 914 and 916 performed to determine a target offset for the clock tree instance 900. As shown in FIG. 9B, the offsets 914 and 916 are decomposed into a vertical component and a horizontal component. Specifically, the offset 914 is decomposed into a vertical offset 918 (4 μm) and a horizontal offset 920 (5 μm), and the offset 916 is decomposed into a vertical offset 922 (2 μm) and a horizontal offset 924 (12 μm). In determining a target offset, the vertical offset 918 of the offset 914 is compared (e.g., by the computing device) with the vertical offset 922 of the offset 916, and the horizontal offset 920 of the offset 914 is compared (e.g., by the computing device) with the horizontal offset 924 of the offset 916.

A target vertical offset 926 is identified (e.g., by the computing device) based on the vertical offsets 918 and 922 being in the same direction (i.e., upward), and a target horizontal offset 928 is identified (e.g., by the computing device) based on the horizontal offsets 920 and 924 being in the same direction (i.e., rightward). The vertical offset 922 of the offset 916 is selected as the target vertical offset 926 (2 μm) based on the vertical offset 922 corresponding to the minimum value (2 μm<4 μm) of the vertical offsets 918 and 922. The horizontal offset 920 is selected as the target horizontal offset 928 (5 μm) based on the horizontal offset 920 corresponding to the minimum value (5 µm<12 µm) of the horizontal offsets 920 and 924.

Figure 10:
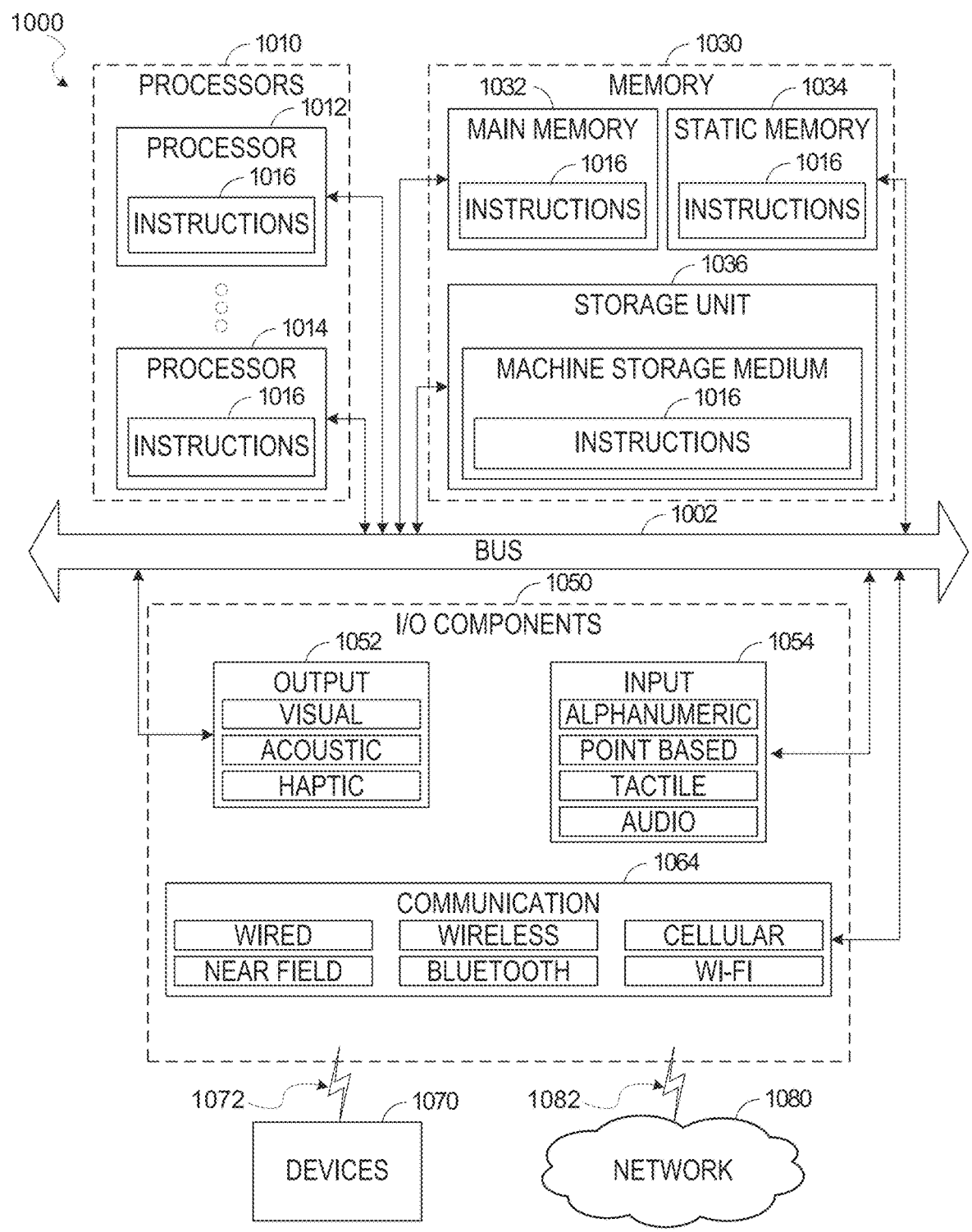
FIG. 10 is a diagrammatic representation of a machine in the example form of a computer system within which a set of instructions for causing the machine to perform any one or more of the methodologies discussed herein may be stored and executed.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute an EDA software system that executes the method 400. Additionally, or alternatively, the instructions 1016 may implement FIGS. 1, 2A-2C, 3A-3C, 9A, and 9B. The instructions 1016 transform the general, non-programmed machine 1000 into a particular machine 1000 programmed to carry out the described and illustrated functions in the manner described here. In alternative embodiments, the machine 1000 operates as a stand-alone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, both accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)).

Executable Instructions and Machine Storage Medium

The various memories (e.g., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
  accessing an integrated circuit design in memory, the integrated circuit design comprising a clock tree comprising one or more routes that interconnect terminals of a plurality of clock tree instances, a clock tree instance of the plurality of clock tree instances comprising a first terminal and a second terminal;
  identifying a portion of a route in the clock tree that has a maximum transitive fanout that is less than a transitive fanout threshold, the transitive fanout threshold corresponding to a threshold number of terminals connected to a branch in the route;
  determining a first offset by measuring a distance between the first terminal of the clock tree instance and the identified portion of the route;
  determining a second offset by measuring a distance between the second terminal of the clock tree instance and the identified portion of the route;
  determining a target offset based on a combination of the first and second offsets;
  moving the clock tree instance toward the identified portion of the route by the target offset; and
  generating an updated clock tree for the integrated circuit design based on moving the clock tree instance toward the identified portion of the route.

2. The system of claim 1, wherein the threshold number of terminals corresponds to a predetermined percentage of a total number of terminals in the clock tree.

3. The system of claim 1, wherein the determining of the first offset comprises:
identifying a connected route of the first terminal;
accessing a binary tree equivalent of the connected route;
traversing the binary tree to identify a target node; and
determining a distance between the first terminal and the target node.

4. The system of claim 3, wherein identifying of the target node is based on the target node having a transitive fanout that is less than the transitive fanout threshold.

5. The system of claim 3, wherein identifying of the target node is based on the target node driving a wirelength that is less than a wirelength threshold.

6. The system of claim 3, wherein:
the first terminal of the clock tree instance drives a connected clock net; and
the traversing of the binary tree comprises performing a top-down search of the binary tree from a root node to identify the target node, the root node corresponding to the first terminal.

7. The system of claim 3, wherein:
the first terminal of the clock tree instance is driven by a connected clock net; and
the traversing of the binary tree comprises performing a bottom-up search of the binary tree from a leaf node to identify the target node, the leaf node corresponding to the first terminal.

8. The system of claim 1, wherein:
the combination of the first and second offsets is a first combination of the first and second offsets;
the target offset is a first target offset; and
the operations further comprise:
  determining a second target offset based on a second combination of the first and second offsets; and
  moving the clock tree instance toward the identified portion of the route by the second target offset.

9. The system of claim 8, wherein:
the first combination of the first and second offsets comprises a statistical mean of the first and second offsets; and
the second combination of the first and second offsets is a minimum of the first and second offsets.

10. The system of claim 8, further comprising:
moving at least one additional clock tree instance in the clock tree, wherein the moving of the clock tree instance toward the identified portion of the route by the second target offset is performed subsequent to moving the at least one additional clock tree instance.

11. The system of claim 1, wherein identifying the route in the clock tree is further based on a wirelength threshold.

12. The system of claim 1, wherein the operations further comprise:
performing a validation to verify that moving the clock tree instance toward the identified portion of the route by the target offset results in a reduction to wirelength in the clock tree; and
moving the clock tree instance back to an initial location in response to an unsuccessful validation.

13. The system of claim 1, wherein the operations further comprise:
generating a layout instance for the integrated circuit design based in part on the updated clock tree, the layout instance describing physical layout dimensions of the integrated circuit design.

14. A method comprising:
accessing an integrated circuit design stored in memory, the integrated circuit design comprising a clock tree comprising one or more routes that interconnect terminals of a plurality of clock tree instances, a clock tree instance of the plurality of clock tree instances comprising a first terminal and a second terminal;
identifying a portion of a route in the clock tree that has a maximum transitive fanout that is less than a transitive fanout threshold, the transitive fanout threshold comprising a threshold number of terminals connected to a branch in the route;
determining, by at least one hardware processor, a first offset based on a distance between the first terminal of the clock tree instance and the identified portion of the route in the clock tree;
determining, by at least one hardware processor, a second offset based on a distance between the second terminal of the clock tree instance and the identified portion of the route;
determining, by at least one hardware processor, a target offset based on a combination of the first and second offsets;
moving, by the at least one hardware processor, the clock tree instance toward the identified portion of the route by the target offset; and generating, by at least one hardware processor, an updated clock tree for the integrated circuit design based on moving the clock tree instance toward the identified portion of the route.

15. The method of claim 14, wherein the determining of the second offset comprises:
   identifying a connected route of the second terminal;
   accessing a binary tree equivalent of the connected route;
   traversing the binary tree to identify a target node, the target node having a transitive fanout that transgresses the transitive fanout threshold; and
   determining a distance between the second terminal and the target node.

16. The method of claim 15, wherein:
   the first terminal of the clock tree instance drives a connected clock net; and
   the traversing of the binary tree comprises performing a top-down search of the binary tree from a root node to identify the target node, the root node corresponding to the second terminal.

17. The method of claim 15, wherein:
   the first terminal of the clock tree instance is driven by a connected clock net; and
   the traversing of the binary tree comprises performing a bottom-up search of the binary tree from a leaf node to identify the target node, the leaf node corresponding to the second terminal.

18. The method of claim 14, wherein:
   the combination of the first and second offsets is a first combination of the first and second offsets;
   the target offset is a first target offset; and
   the operations further comprise:
      determining a second target offset based on a second combination of the first and second offsets; and
      moving the clock tree instance toward the identified portion of the route by the second target offset.

19. The method of claim 18, wherein:
   the first combination of the first and second offsets comprises a statistical mean of the first and second offsets; and
   the second combination of the first and second offsets is a minimum of the first and second offsets.

20. A computer-storage medium storing instructions, which when executed by the machine, cause the machine to perform operations comprising:
   accessing an integrated circuit design stored in memory, the integrated circuit design comprising a clock tree comprising one or more routes that interconnect terminals of a plurality of clock tree instances, a clock tree instance of the plurality of clock tree instances comprising a first terminal and a second terminal;
   identifying a portion of a route in the clock tree based on a wirelength threshold;
   determining a first offset based on a distance between the first terminal of the clock tree instance and a the route in the clock tree;
   determining a second offset based on a distance between the second terminal of the clock tree instance and the identified portion of the route;
   determining a target offset based on a combination of the first and second offsets;
   moving the clock tree instance toward the identified portion of the route by the target offset;
   generating an updated clock tree based on moving the clock tree instance toward the identified portion of the route; and
   generating a layout instance for the integrated circuit design based in part on the updated clock tree, the layout instance describing physical layout dimensions of the integrated circuit design.

* * * * *